United States Patent [19]

Dodge et al.

[11] 4,188,814

[45] Feb. 19, 1980

[54] SELF CLEANING ANIMAL FLOOR ASSEMBLY AND METHOD OF FABRICATING SAME

[75] Inventors: Gordon L. Dodge, Ankeny; Lewis D. Comstock, Oskaloosa; David J. Richards, Cedar; Donald L. Brackett, Oskaloosa, all of Iowa

[73] Assignee: Mahaska Industries, Inc., Oskaloosa, Iowa

[21] Appl. No.: 956,571

[22] Filed: Oct. 30, 1978

[51] Int. Cl.$^2$ .................................... B21D 28/26
[52] U.S. Cl. ........................ 72/324; 29/163.5 R
[58] Field of Search ............. 29/163.5 R; 113/116 A; 72/325, 335, 338, 339, 379, 324; 119/28; 52/180, 671, 672, 673, 674, 675

[56] References Cited

U.S. PATENT DOCUMENTS

| | | | |
|---|---|---|---|
| 1,502,873 | 7/1924 | Oberg | 29/163.5 R |
| 1,996,561 | 4/1935 | Ball | 29/163.5 R |
| 2,771,077 | 11/1956 | Karlsson et al. | 29/163.5 R |
| 3,093,216 | 6/1963 | Dunham | 52/180 |

FOREIGN PATENT DOCUMENTS 2232846  1/1974  Fed. Rep. of Germany ............. 52/180

Primary Examiner—Michael J. Keenan
Attorney, Agent, or Firm—Zarley, McKee, Thomte, Voorhees & Sease

[57] ABSTRACT

An elongated sheet of stainless steel material includes alternately spaced apart laterally extending slots and ridges formed by removing a length of material and then applying downward pressure within the slots to form downwardly extending rounded slot edges. Upward pressure is applied along a line between the slots to form rounded ridges having oppositely extending downwardly sloping surfaces which merge into flat surfaces extending to the adjacent slot edges. The opposite sides of the floor members include downwardly extending side walls which slope inwardly towards each other such that side walls of adjacent floor members form elongated openings which increase in width downwardly. An A-shaped strengthening member may be provided under the floor member along its center line and supported by vertically disposed end channels the upper legs of which have downwardly extending return bend portions providing rounded edges therealong.

1 Claim, 6 Drawing Figures

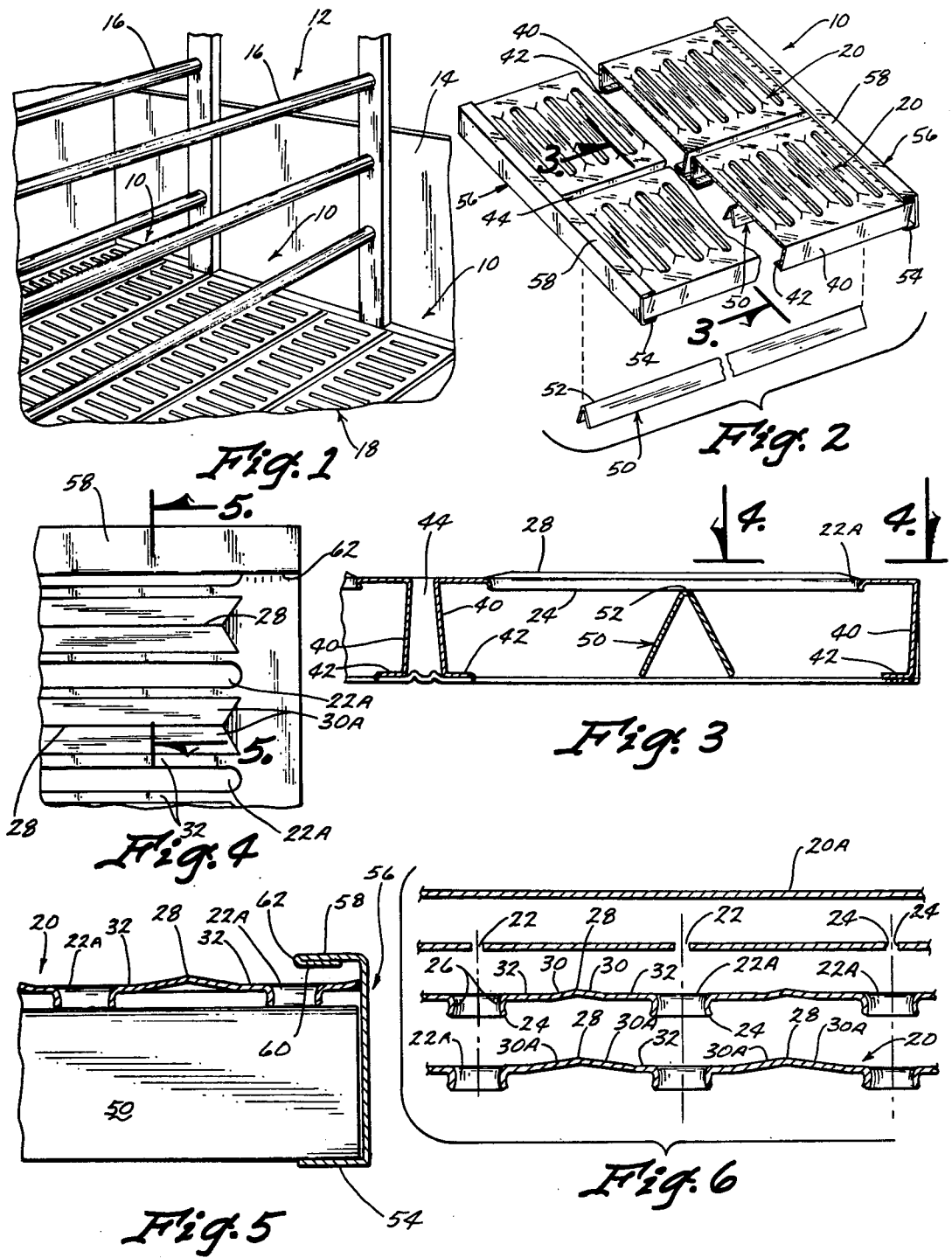

SELF CLEANING ANIMAL FLOOR ASSEMBLY AND METHOD OF FABRICATING SAME

This is a division of application Ser. No. 835,504, filed Sept. 22, 1977.

BACKGROUND OF THE INVENTION

Various materials including wood, fiberglass, concrete, and masonry have been used for forming animal floors having drain slots but all of these structures have had certain undesirable features. Various types of metal materials have also been used with less than complete success. The self-cleaning floor assembly of this invention obviates the objections to other floor assembly configurations and materials.

SUMMARY OF THE INVENTION

The animal floor assembly of this invention is self-cleaning and strengthened by providing alternating slots and ridges due to the fact that the animal's feet slide from the top of the ridges towards the slots, cleaning the floor surfaces by moving waste materials into the slots where it drops into a holding tank. The ridges also strengthen the floor member. The surfaces adjacent the slots are flat and unworked and thus retain their maximum structural strength to resist deformation. Additional strength may be provided by an upstanding A-shaped strengthening member positioned along the center line of the floor member.

The floor member includes only rounded exposed edges thereby preventing any injury to the animal's feet. The side edges of the slots are downwardly turned and rounded while the upper leg of end channel members includes a return downwardly extending bend portion which provides a rounded edge along the leg extending over the floor member. The top of the ridges is smooth and slightly rounded.

BRIEF DESCRIPTION OF THE DRAWINGS

FIG. 1 is a fragmentary perspective view of a farrowing and nursery stall utilizing the self-cleaning animal floor assembly of this invention.

FIG. 2 is an enlarged fragmentary perspective view of the floor assembly only.

FIG. 3 is a cross sectional view taken along line 3—3 in FIG. 2.

FIG. 4 is a cross-sectional view taken along line 4—4 in FIG. 3.

FIG. 5 is a cross-sectional view taken along line 5—5 in FIG. 4.

FIG. 6 is a view showing the sequential steps of fabrication of the floor member to provide the slots and ridges.

DESCRIPTION OF THE PREFERRED EMBODIMENT

The floor assembly of this invention is referred to generally in FIG. 2 by the reference numeral 10 and is seen in FIG. 1 in a farrowing and nursery stall 12 having side walls 14 and partitions 16. A series of floor assemblies 10 in side by side relationship form the floor 18 for the stall 12.

Each floor assembly 10 includes a pair of floor members 20. Each floor member 20 is formed from stainless steel sheet metal as seen in FIG. 6 wherein a sheet of sheet metal 20a first has spaced apart pieces of material removed to form slots 22 as defined by side edges 24 which in the next step are downwardly turned to form rounded surfaces 26 around the enlarged openings 22a. Simultaneously with the forming of the rounded surfaces 26 an upward die pressure is applied along the center line between the adjacent slots 22a to begin the formation of ridges 28 having oppositely sloping surfaces 30 which merge into flat surfaces 32 which extend to the rounded surfaces 26 of the slots 22a. In the final step the surfaces 30 are sloped additionally to provide surfaces 30a.

As seen in FIG. 3, the floor members 20 include downwardly extending side walls 40 which slope inwardly and terminate in horizontally inwardly extending end flanges 42. Adjacent side walls 40 are spaced apart to provide a slot 44 therebetween which increases in width downwardly.

The longitudinal center of each floor member 20 may be strengthened by the addition of an A-shaped strengthening member 50 which engages at its apex 52 the edges 24 of the rounded slot surfaces 26 as seen in FIG. 3.

The opposite ends of the strengthening members 50 are supported by the lower inwardly extending legs 54 of end channels 56 welded to the floor members 20. The upper inwardly extending legs 58 include inwardly extending return bend portions 60 forming rounded exposed edges 62.

Thus, it is seen that a floor assembly is provided that may be easily assembled to provide any desired floor which is self-cleaning due to the fact that the animals dirtying the floor also sweep it clean by the action of their feet on the floor surface. The feet engaging the ridges 28 will naturally slide along the sloped surfaces 30A across the horizontal flat surfaces 32 towards the openings 22A. It is seen that there is sufficient width to the horizontal flat surfaces 32 that it retains its structural strength in that it is unworked material but the width of these surfaces is not so great that the animal's feet will not move across them towards the openings 22A once the feet have started to slide down the sloped surfaces 30A. It is appreciated that if the slope is not sufficient or the width of the horizontal flat surfaces is too great the feet will not slide the debris to the openings 22A and thus no self-cleaning action will occur. At no time will the animals feet be injured since the feet are only exposed to rounded and smooth surfaces. Notably, the rounded downwardly extending surfaces 24 form the edges of the elongated slots 22A while the upper leg 58 of the channel 56 is rounded at 62 due to the return bend portion 60.

All debris will fall through the slots as it is unobstructed due to the configuration of the slots 44 which increase in width downwardly and the strengthening members 50 have downwardly sloping legs which are self-cleaning.

Furthermore, the floor members 20 require a minimum of material but have a construction that provides maximum strength and in particular the flat surfaces 32 which are unworked provide maximum strength where the greatest structural loads are applied thereby avoiding fatigue cracking of these areas, and consequent failure of the floor members. It is also appreciated that the stainless steel material is non-corrosive.

What is claimed is:

1. The method of forming a self-cleaning animal floor assembly including floor members having alternating slots and ridges with said ridges including substantially flat surfaces extending from adjacent slot edges and merging into upwardly sloping surfaces converging to form ridges, said method including the steps of, provided a flat piece of sheet metal, removing a length of metal on the centerline of the slot being formed, applying downward flaring pressure to the side edges of said slot to provide downwardly extending rounded slot side edges, applying upward pressure to said sheet metal along a line immediately between said slots to form upwardly sloping surfaces converging to provide a rounded ridge, and maintaining flat surfaces between said slots and said upwardly sloping surfaces including fixing the width of said flat surfaces sufficiently narrow that said animals' feet will continue moving across said flat surfaces to said slots once said feet have started sliding down said upwardly sloping surfaces.